(12) United States Patent
Kupratis et al.

(10) Patent No.: US 10,107,193 B2
(45) Date of Patent: Oct. 23, 2018

(54) REVERSE CORE GEAR TURBOFAN

(71) Applicant: UNITED TECHNOLOGIES CORPORATION, Hartford, CT (US)

(72) Inventors: Daniel Bernard Kupratis, Wallingford, CT (US); Francis R. Moon, Granby, CT (US)

(73) Assignee: United Technologies Corporation, Farmington, CT (US)

( * ) Notice: Subject to any disclaimer, the term of this patent is extended or adjusted under 35 U.S.C. 154(b) by 507 days.

(21) Appl. No.: 14/824,157

(22) Filed: Aug. 12, 2015

(65) Prior Publication Data

US 2015/0345384 A1 Dec. 3, 2015

Related U.S. Application Data

(63) Continuation of application No. 13/431,048, filed on Mar. 27, 2012, now Pat. No. 9,239,004.

(51) Int. Cl.
*F02C 3/10* (2006.01)
*F02C 6/02* (2006.01)
(Continued)

(52) U.S. Cl.
CPC .............. *F02C 6/02* (2013.01); *F01D 17/141* (2013.01); *F02C 3/05* (2013.01); *F02C 3/10* (2013.01); *F02C 3/107* (2013.01); *F02C 3/13* (2013.01); *F02C 3/145* (2013.01); *F02C 7/36* (2013.01); *F02C 9/18* (2013.01); *F02K 3/06* (2013.01);
(Continued)

(58) Field of Classification Search
CPC .. F02C 3/06; F02C 3/067; F02C 3/073; F02C 3/10; F02C 3/107; F02C 7/36; F02K 3/00; F02K 3/02; F02K 3/06; F02K 3/065; F02K 3/072
See application file for complete search history.

(56) References Cited

U.S. PATENT DOCUMENTS 3,472,487 A  10/1969  Moellmann
4,005,575 A   2/1977  Scott et al.
(Continued)

FOREIGN PATENT DOCUMENTS

CA    2724611 A1    6/2011
DE    2840201 A1    3/1980
WO    02081883 A2  10/2002

OTHER PUBLICATIONS

International Search Report and Written Opinion for counterpart PCT/US2013/033776 completed on Jan. 15, 2014, from parent U.S. Appl. No. 13/431,048.
(Continued)

*Primary Examiner* — Arun Goyal
(74) *Attorney, Agent, or Firm* — Carlson, Gaskey & Olds, P.C.

(57) ABSTRACT

A gas turbine engine comprises a fan at an axially outer location, the fan rotating about an axis of rotation, delivering air into an outer bypass duct, a radially middle duct, and a radially inner core duct. Air from the inner core duct is directed into a compressor, and then flows axially in a direction back toward the fan through a combustor section, and across a core turbine section, and is then directed into the middle duct. A gear reduction drives the fan from a fan drive turbine section. A method of operating a gas turbine engine is also disclosed.

3 Claims, 11 Drawing Sheets

(51) Int. Cl.
- *F02C 7/36* (2006.01)
- *F02C 3/14* (2006.01)
- *F02C 3/05* (2006.01)
- *F02K 3/065* (2006.01)
- *F02C 3/107* (2006.01)
- *F02K 3/06* (2006.01)
- *F01D 17/14* (2006.01)
- *F02K 3/075* (2006.01)
- *F02C 3/13* (2006.01)
- *F02C 9/18* (2006.01)

(52) U.S. Cl.
CPC .............. *F02K 3/065* (2013.01); *F02K 3/075* (2013.01); *F05D 2220/32* (2013.01); *F05D 2220/323* (2013.01); *F05D 2250/36* (2013.01); *F05D 2260/4023* (2013.01); *F05D 2260/4031* (2013.01); *F05D 2270/053* (2013.01)

(56) References Cited

U.S. PATENT DOCUMENTS

| | | |
|---|---|---|
| 4,141,212 A | 2/1979 | Koschier |
| 5,105,618 A | 4/1992 | Lardellier |
| 6,082,975 A | 7/2000 | Lahens |
| 7,214,157 B2 | 5/2007 | Flamang et al. |
| 7,726,113 B2 | 6/2010 | Orlando et al. |
| 8,096,753 B2 | 1/2012 | Norris |
| 8,365,510 B2 * | 2/2013 | Lugg ................ F01D 15/10 310/11 |
| 2003/0167750 A1 | 9/2003 | Bornhoft et al. |
| 2005/0060983 A1 | 3/2005 | Lardellier |
| 2010/0154383 A1 | 6/2010 | Ress, Jr. |
| 2010/0212285 A1 | 8/2010 | Negulescu |
| 2011/0056208 A1 | 3/2011 | Norris et al. |

OTHER PUBLICATIONS

International Preliminary Report on Patentability for counterpart PCT/US2013/033776 dated Oct. 9, 2014 from parent U.S. Appl. No. 13/431,048.

Singapore Search Report for Singapore Patent Application No. 11201404963V dated Oct. 30, 2015.

Supplementary European Search Report for European Application No. 13812636.2 dated Jan. 22, 2016.

European Search Report for European Application No. 16190896.7 dated Jan. 16, 2017.

* cited by examiner

REVERSE CORE GEAR TURBOFAN

CROSS-REFERENCE TO RELATED APPLICATION

This application is a continuation of U.S. patent application Ser. No. 13/431,048, filed Mar. 27, 2012.

STATEMENT REGARDING FEDERALLY SPONSORED RESEARCH OR DEVELOPMENT

This invention was made with government support under Contract No. FA8650-09-D-2923/DO13 awarded by the United States Air Force. The Government has certain rights in this invention.

BACKGROUND

This application relates to a reverse core geared turbofan engine having a turbine driven by fan air.

Gas turbine engines are known, and typically include a fan delivering air into a compressor section. The fan may also deliver air into a bypass duct to provide propulsion. The air delivered into the compressor is compressed and moved into a combustion section where it is mixed with fuel and ignited. Products of this combustion pass downstream over turbine rotors, driving them to rotate. The rotation of the turbine rotors in turn drives the fan and compressor sections.

Recently a speed reduction has been incorporated between a fan drive turbine and the fan. This allows the fan to rotate at a slower speed than other components that may be driven by the same turbine. As an example, a low or intermediate compressor is often driven by the fan drive turbine.

Another feature that has been incorporated into gas turbines is a "reverse core" engine. In a reverse core engine, the compressor delivers air in an axial direction toward a front of the aircraft and into a combustion section. The products of combustion pass downstream over turbine rotors, however, those turbine rotors are located in an axial direction toward the front of the engine, and typically the fan.

SUMMARY

In a featured embodiment, a gas turbine engine comprises a fan at an axially outer location, the fan rotating about an axis of rotation, delivering air into an outer bypass duct, a radially middle duct, and a radially inner core duct. Air from the inner core duct is directed into a compressor, and then flows axially in a direction back toward the fan through a combustor section, and across a core turbine section, and is then directed into the middle duct. A gear reduction drives the fan from a fan drive turbine section.

In another embodiment according to the previous embodiment, a shaft downstream of the gear reduction relative to the fan drive turbine section also drives the booster fan.

In another embodiment according to any of the previous embodiments, a shaft downstream of the gear reduction is also connected to rotate with the cold turbine.

In another embodiment according to any of the previous embodiments, a fan booster delivers air into the radially middle duct and the radially inner core, and a cold turbine in the radially inner core rotates with a clutched shaft separate from a fan shaft driving the fan. A clutch selectively connects the clutched shaft to the fan shaft such that the fan shaft can selectively drive the clutched shaft.

In another embodiment according to any of the previous embodiments, there are at least a plurality of core turbine sections, with one of the plurality of the core turbine sections driving the fan through the gear reduction and a second of the core turbine sections driving the fan booster.

In another embodiment according to any of the previous embodiments, the compressor section includes at least a first compressor section and a second compressor section downstream of the first compressor section, and the core turbine section includes at least a first core turbine section and a second core turbine section, with the first core turbine section driving the second compressor section and the second core turbine section driving the first compressor section, with the second turbine section and the first compressor section operating at a slower speed and at lower pressures than the first turbine section and the second compressor section.

In another embodiment according to any of the previous embodiments, a first cold turbine section is positioned adjacent a booster fan, and a second cold turbine section is positioned downstream of the first cold turbine section in the path of air flowing through the inner core duct, and upstream of the compressor section.

In another embodiment according to any of the previous embodiments, one of the first and second cold turbine sections is provided with a flow diverter that allows bypass of air around a rotor associated with the one of the cold turbine sections.

In another embodiment according to any of the previous embodiments, a radially outer extent of blades associated with the one of the cold turbine sections is spaced inwardly of a radially outer position for the flow diverter to allow bypass of air radially outwardly of the radially outermost extent of the blades of the one of the cold turbine sections.

In another embodiment according to any of the previous embodiments, there are a pair of flow diverters, with the pair of flow diverters being movable between a position allowing the bulk of the air delivered to the compressor section to bypass the turbine rotors by passing radially outwardly of the radially outermost extent of the blades, and the flow diverters being movable to an alternative position wherein the great bulk of the air delivered across the one of the cold turbine sections passes radially inwardly of the radially outermost extent of the fan turbine blades.

In another embodiment according to any of the previous embodiments, the flow diverter is associated with the first cold turbine section.

In another embodiment according to any of the previous embodiments, the flow diverter is associated with the second cold turbine section.

In another embodiment according to any of the previous embodiments, a cold turbine section in the radially inner core duct is provided with a flow diverter that allows bypass of air around a rotor associated with the cold turbine section.

In another embodiment according to any of the previous embodiments, a radially outer extent of blades associated with the cold turbine section is spaced inwardly of a radially outer position for the flow diverter to allow bypass of air radially outwardly of the radially outermost extent of the blades in the cold turbine section.

In another embodiment according to any of the previous embodiments, there are a pair of flow diverters, with the pair of flow diverters being movable to a position allowing the bulk of the air delivered to the compressor section to bypass the turbine rotor by passing radially outwardly of the radially outermost extent of the blades, and the flow diverters being movable to an alternative position with a great bulk of the air delivered across the cold turbine section passes radially inwardly of the radially outermost extent of the fan turbine blades.

In another embodiment according to any of the previous embodiments, the cold turbine section associated with the flow diverter is positioned adjacent to the booster fan.

In another embodiment according to any of the previous embodiments, the cold turbine section associated with the flow diverter is positioned at a location adjacent to the compressor on an axial side of the compressor spaced away from the fan.

In another embodiment according to any of the previous embodiments, the cold turbine section associated with the flow diverter is positioned adjacent to the booster fan.

In another embodiment according to any of the previous embodiments, the cold turbine section associated with the flow diverter is positioned at a location adjacent to the compressor on an axial side of the compressor spaced away from the fan.

In another embodiment according to any of the previous embodiments, the cold turbine section associated with the flow diverter is positioned adjacent to a booster fan.

In another featured embodiment, a method of operating a gas turbine engine comprises the steps of operating a turbine section having blades with a radially outermost extent, and a flow diverter that is operable to divert air radially inwardly of the radially outermost extent of the turbine blades, or allow air to pass radially outwardly of the radially outermost extent of the turbine blades. The flow diverter is positioned to increase or decrease the amount of gas passing across that turbine rotor to increase or decrease a power output by the turbine rotor.

In another embodiment according to the previous embodiment, there are a pair of flow diverters, with the flow diverters moving between a position which passes all of the gas radially inwardly of the radially outermost extent of the turbine rotors, and to a position which diverts the gas radially outwardly of the radially outermost extent.

In another embodiment according to any of the previous embodiments, the flow diverter is moved to the position to allow bypass of the gases in low power conditions, such as when a gas turbine associated with the turbine section is in a aircraft at cruise conditions, and the flow diverter being moved to direct the air radially inwardly of the radially outermost extent at high power conditions, such as take-off for that aircraft.

These and other features of the invention would be better understood from the following specifications and drawings, the following of which is a brief description.

DETAILED DESCRIPTION

Figure 1:
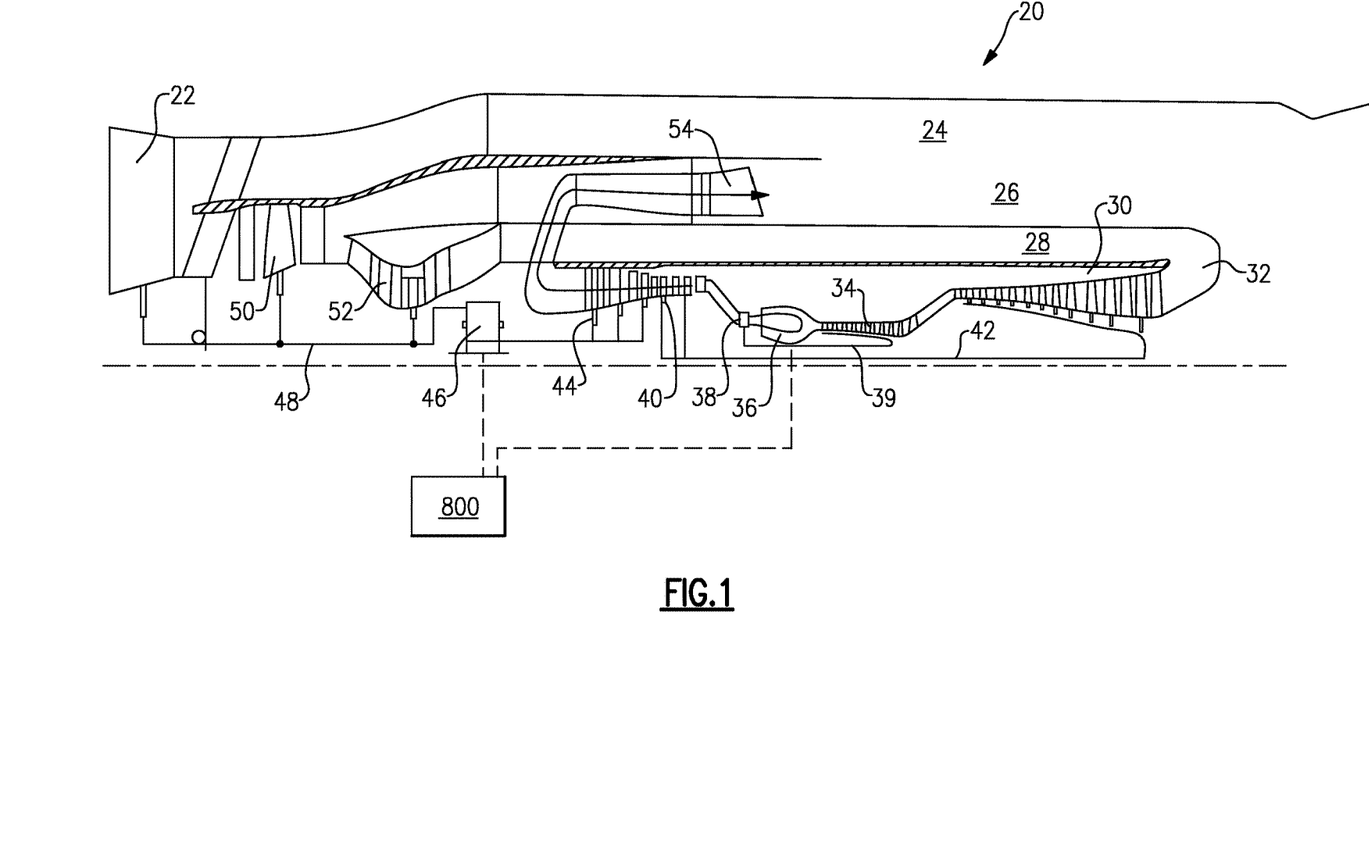
FIG. 1 shows a first embodiment.

FIG. 1 shows a gas turbine engine 20 having a fan 22 delivering air into three flowpaths, as an outer bypass propulsion flowpath 24, a middle flowpath 26 wherein the air will mix with exhaust from an exhaust duct 54, and an inner flow duct 28 which will deliver air into a core inlet duct 32 for the reverse core engine 20.

A fan booster 50 is positioned downstream of the fan 22 and further drives the air into the flowpaths 26 and 28. A turbine 52 (or cold turbine) receives the air from the inner flowpath 28 and extracts energy from the air as it is driven to rotate.

The air from the turbine 52 passes into the inner core flowpath 28, the duct 32, and into a low pressure compressor 30. The air is compressed and delivered into a high pressure compressor 34. The air is mixed with fuel in a combustion section 36 and ignited.

Products of the combustion pass downstream over a high pressure turbine 38, a low pressure turbine 40 and another low pressure turbine 44. Downstream of the low pressure turbine 44, exhaust gases exhaust from the duct 54, and into the middle airflow duct 26.

The turbine 40 drives a spool 42 to drive the low pressure compressor 30. The high pressure turbine 38 drives a spool 39 to in turn drive a high pressure compressor 34.

The turbine 44 is a fan drive turbine, and drives a gear reduction 46 to in turn drive a shaft 48. The shaft 48 is operatively connected to drive the fan blade 22, the fan booster 50 and the turbine 52. Notably, the turbine 52 may also extract energy from the air delivered by the fan booster 50 to rotate the shaft 48.

The provision of a turbine driven by the "cold" air downstream of the fan booster 50 provides greater efficiency to the overall arrangement.

Figure 2:
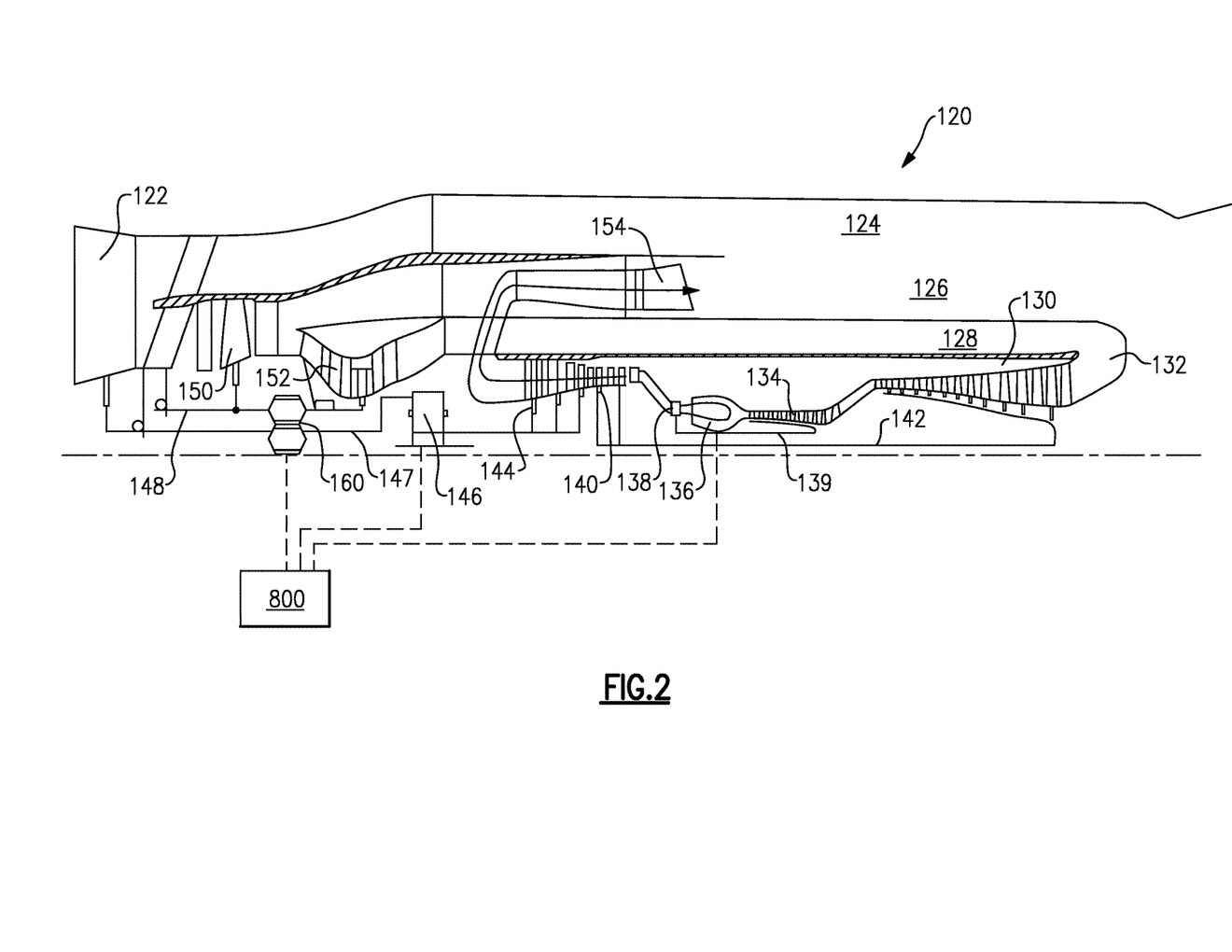
FIG. 2 shows a second embodiment.

FIG. 2 shows another embodiment 120. In embodiment 120, components which are generally the same as the FIG. 1 embodiment bear like numbers, however, increased by 100. Embodiment 120 differs in that the gear reduction 146 drives a shaft 147. The shaft 147 is clutched by clutch 160 to a shaft 148 which drives the fan booster 150, and the turbine 152.

The clutch may be engaged to provide greater efficiency by either capturing the rotation of the turbine 152, or allowing it to free rotate and drive the fan booster 150 on its own.

Figure 3:
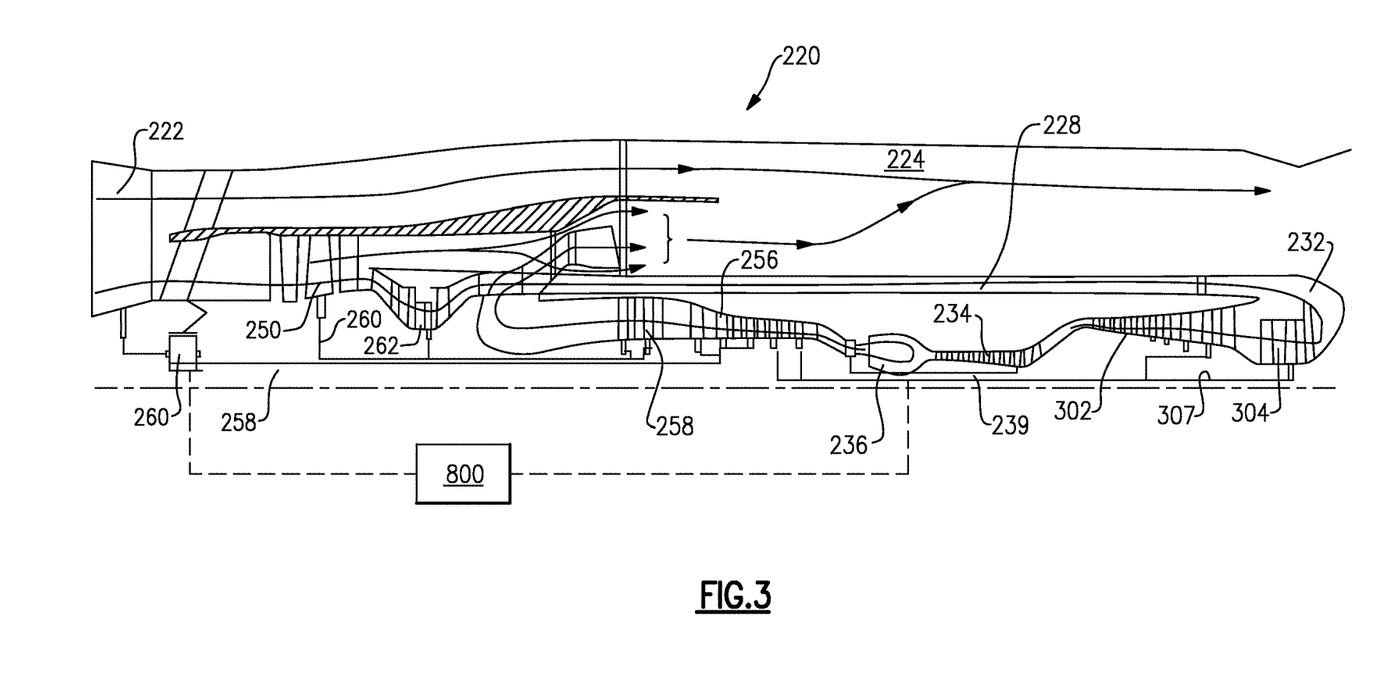
FIG. 3 shows a third embodiment.

FIG. 3 shows yet another embodiment 220. A turbine 256 drives the gear reduction 260 to drive the fan rotor 222. Again, components which are similar to those in FIGS. 1 and 2 are identified by the same reference numeral, only increased by 200.

A separate turbine 258 is connected to the cold turbine 262, and the booster fan blade 250 by a spool 260. In this regard, the power delivered to the fan booster 250, and how the power generated by the turbine 262 is utilized, has some additional freedoms.

FIG. 3 also shows a second fan air turbine section 304 which is positioned downstream of the duct 232 and leading into the inlet for the compressor section 302. The turbine section 304 is operable to rotate with a shaft 307 that rotates with the low pressure turbine 256 and the low pressure compressor 302.

Figure 4A:
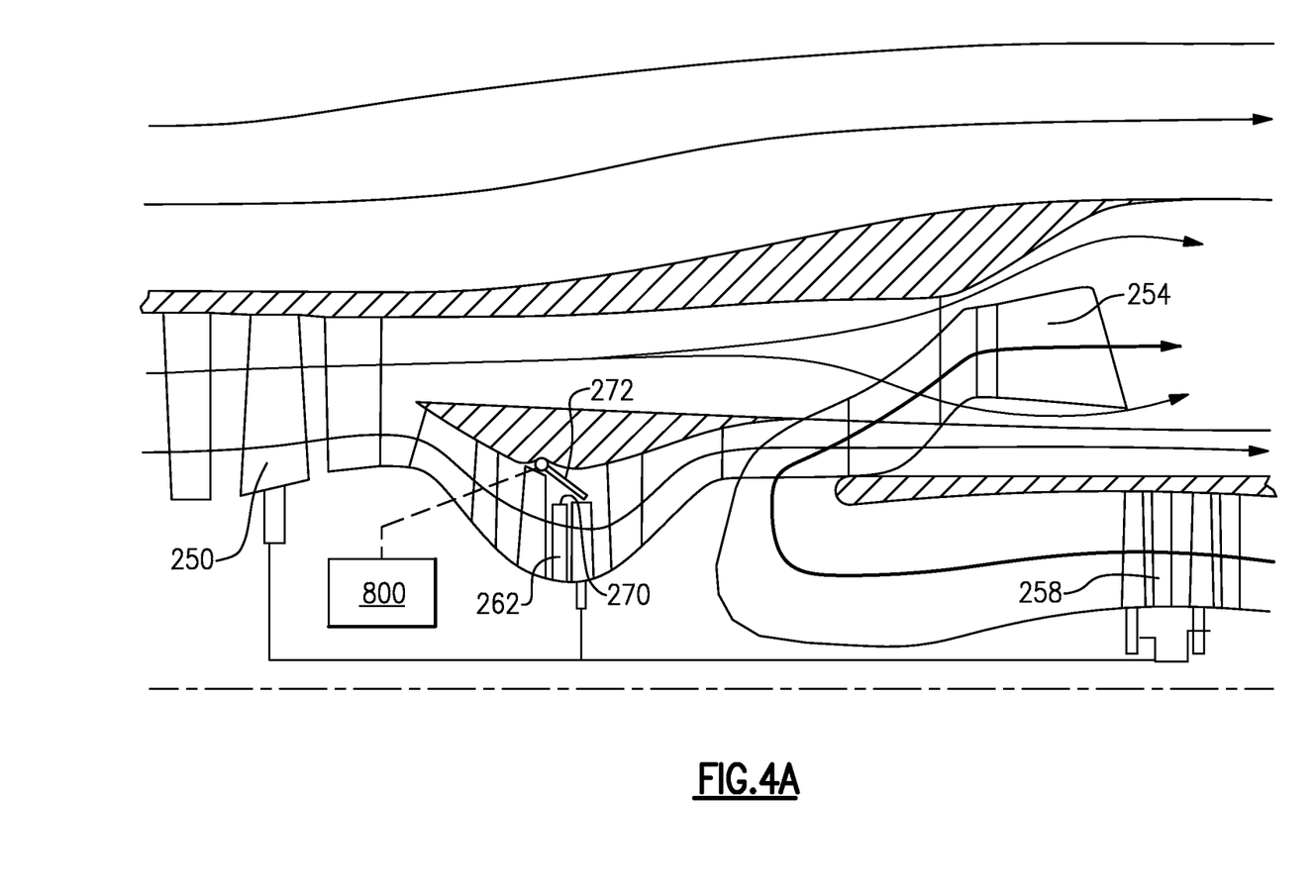
FIG. 4A shows a feature which may be incorporated into any one of the FIG. 1-3 embodiments.

FIG. 4A shows another feature which can be incorporated into any one of the three above-referenced embodiments. As shown, the turbine blades 262 have a relatively short radially outer edge 270. A flow diverter, which could be a bypass door 272 of some sort is shown in an operative position to increase power flow. This position may be utilized such during takeoff of an associated aircraft on a hot day.

Notably, while the features of FIGS. 4-7 are shown associated with the FIG. 3 embodiment, they would have application into any one of the embodiments illustrated in this application.

Figure 4B:
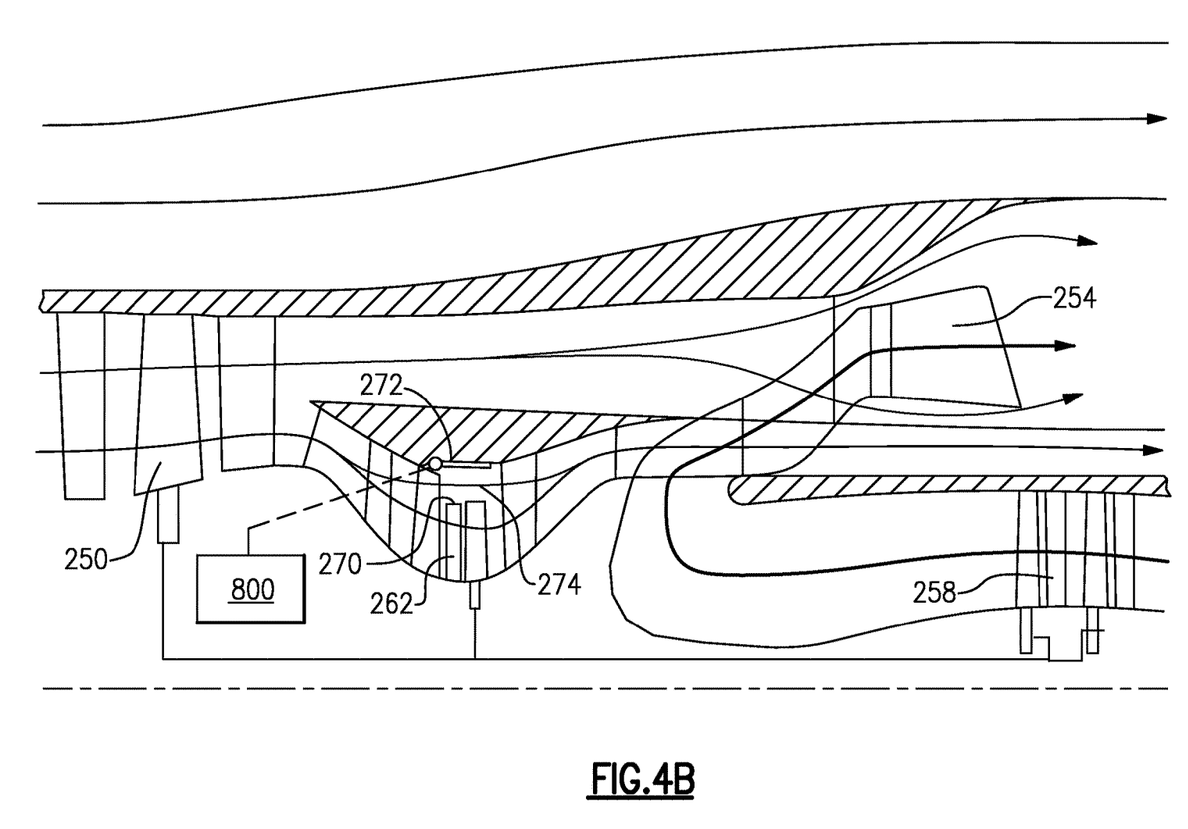
FIG. 4B shows the first embodiment feature in a second operative position.

FIG. 4B shows another operative position wherein the door 272 is pivoted outwardly to create a bypass flowpath 274 which avoids the blades in the turbine section 262. The bypass door could be opening during cruise conditions. In either case, the bypass flow 274 is still directed into the inner flow path 228, and to the inlet duct 232 (for example, shown in FIG. 3).

Figure 5A:
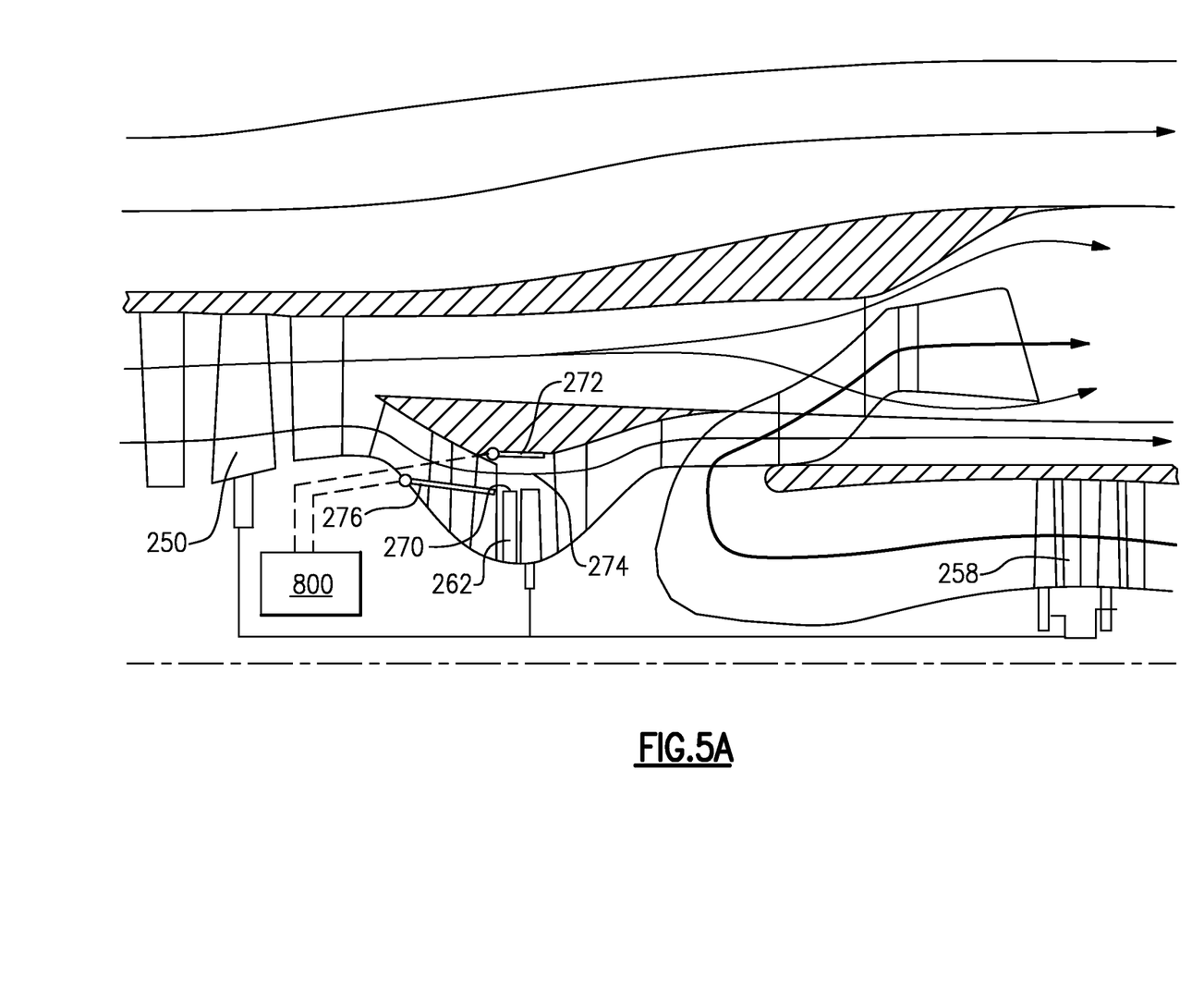
FIG. 5A shows another embodiment feature which can be incorporated into any of the FIGS. 1-3 embodiments.

FIG. 5A shows a second embodiment feature wherein a pair of flow diverters or doors 272 and 276 are utilized. During a cruise condition as shown in FIG. 5A the door of 272 is pivoted outwardly as is the door 276. Now, all air is diverted away from the turbine section 262 and through the bypass path 274.

Figure 5B:
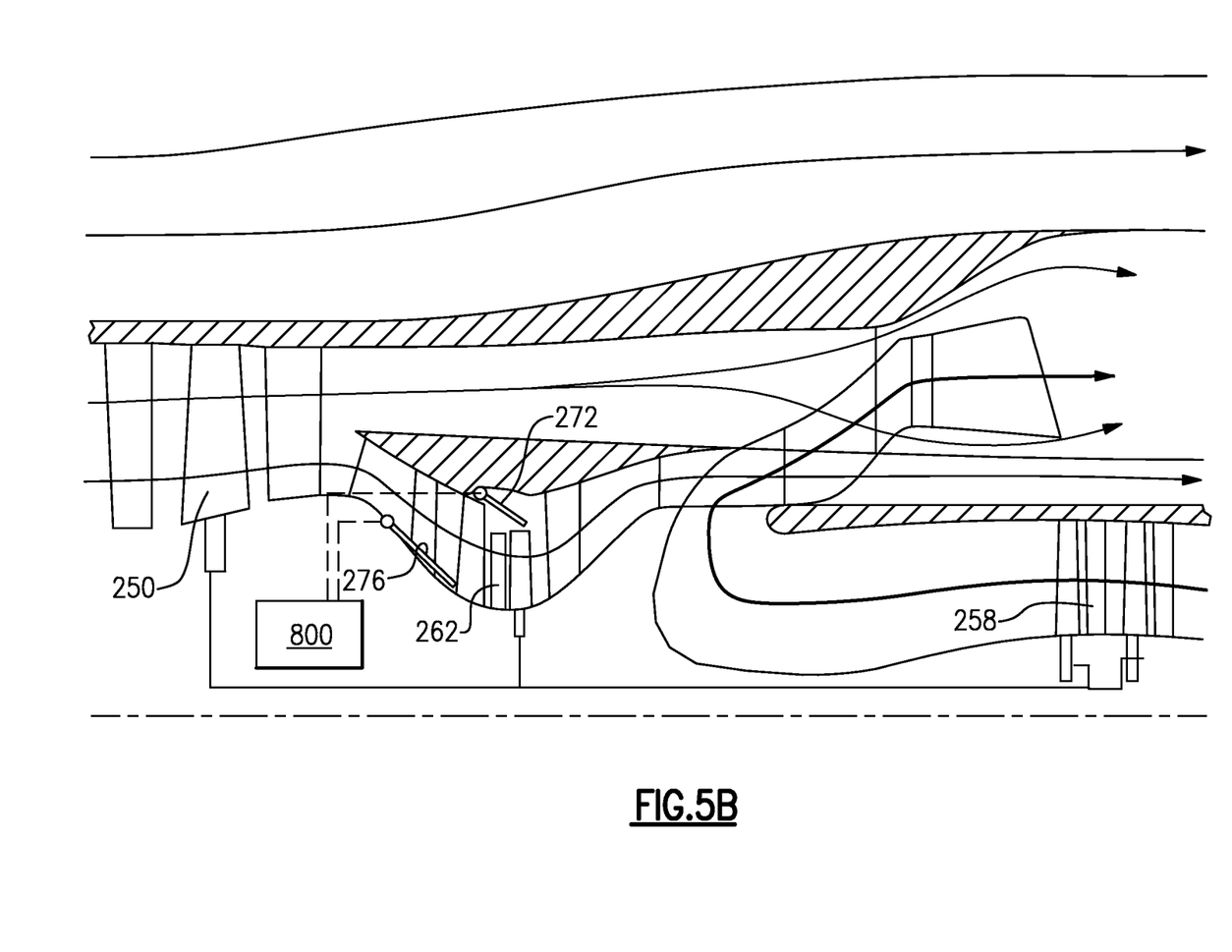
FIG. 5B shows the second embodiment feature in a second operative position.

FIG. 5B shows an alternative operative position where the doors 272 and 276 are pivoted inwardly such that the great bulk of the air would now be directed across the turbine section 262. This position would be utilized during high power conditions such as a takeoff on a hot day.

Figure 6A:
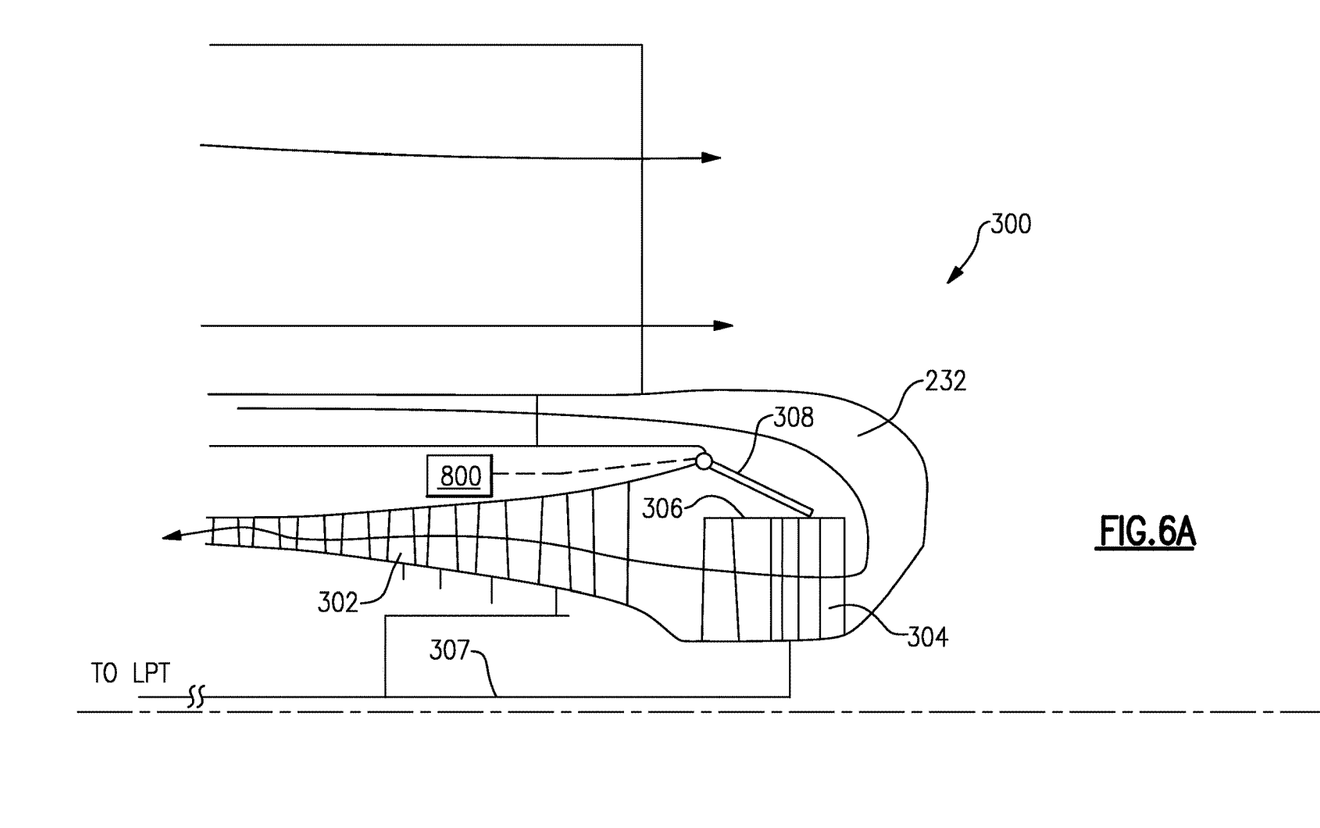
FIG. 6A shows another embodiment feature which can be incorporated into anyone of the FIGS. 1-3 embodiments.

FIG. 6A shows yet another embodiment 300. In embodiment 300, the turbine 302 is positioned downstream of the inlet duct 232, and upstream of the low pressure compressor 302. Door 308 operates similarly to the FIG. 4A/4B embodiment to direct all air across the turbine blades in turbine 304, and within the radial extent of the blades (that is, radially inwardly of the radially outermost extent 306).

FIG. 6A would be utilized in high power conditions such as during takeoff of an associated aircraft on a hot day.

Figure 6B:
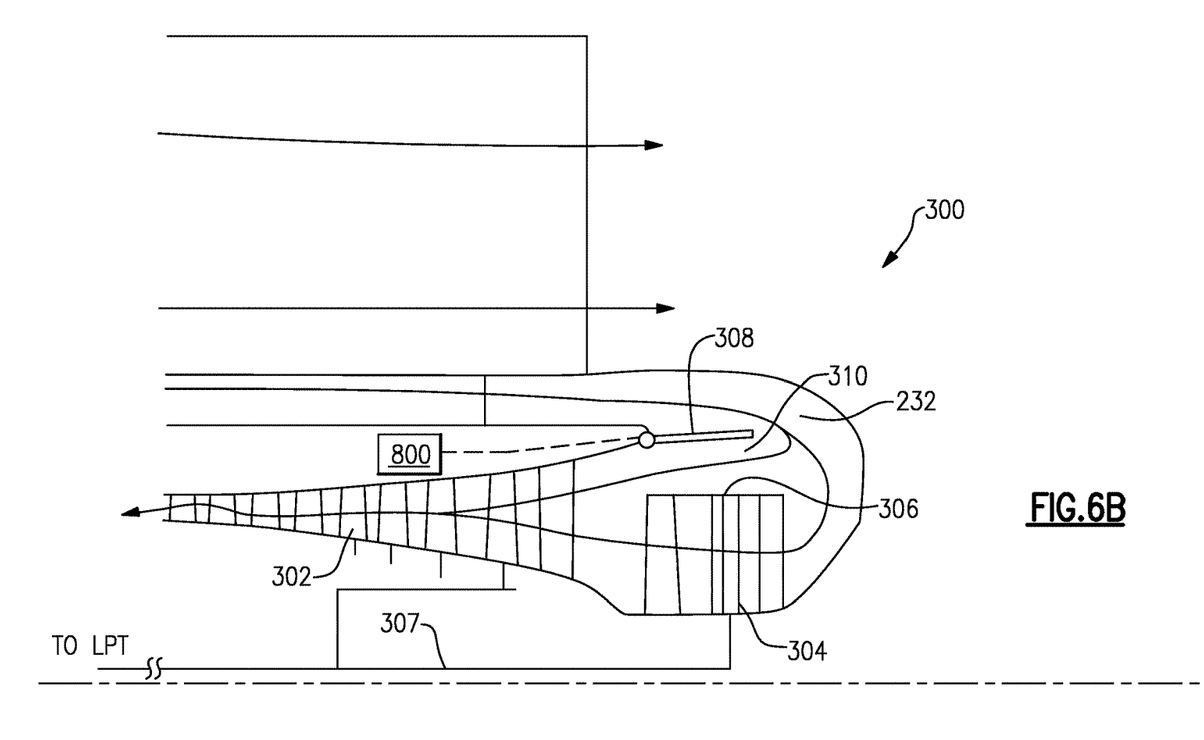
FIG. 6B shows the third embodiment feature in a second mode of operative position.

FIG. 6B shows the door 308 pivoted radially outwardly to provide a bypass flowpath 310 which is outward of the radially outer end 306 of the blades in the turbine 304. This would be utilized at low power conditions such as cruise.

Figure 7A:
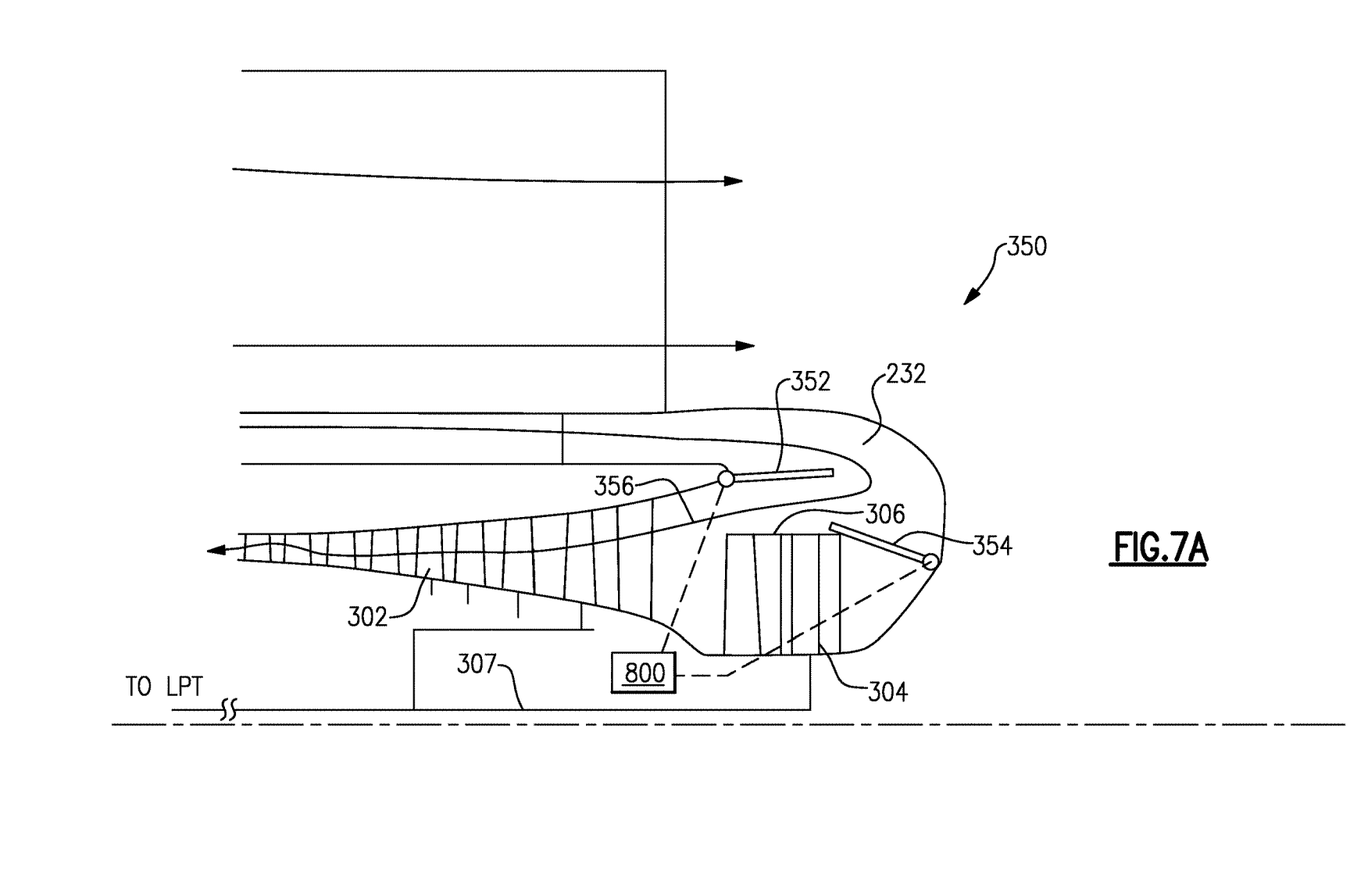
FIG. 7A shows a fourth embodiment feature which can be incorporated into any one of the FIGS. 1-3 embodiments.

FIG. 7A shows another embodiment 350. Again, the turbine 304 is positioned downstream of the duct 232, but upstream of the low pressure compressor 302. A second door 354 is provided in addition to the door 352. In the FIG. 7A position, the bypass 356 is opened, such as may be utilized during cruise conditions. The lower door 354 ensures that the great bulk of air avoids the turbine blades in turbine section 304.

Figure 7B:
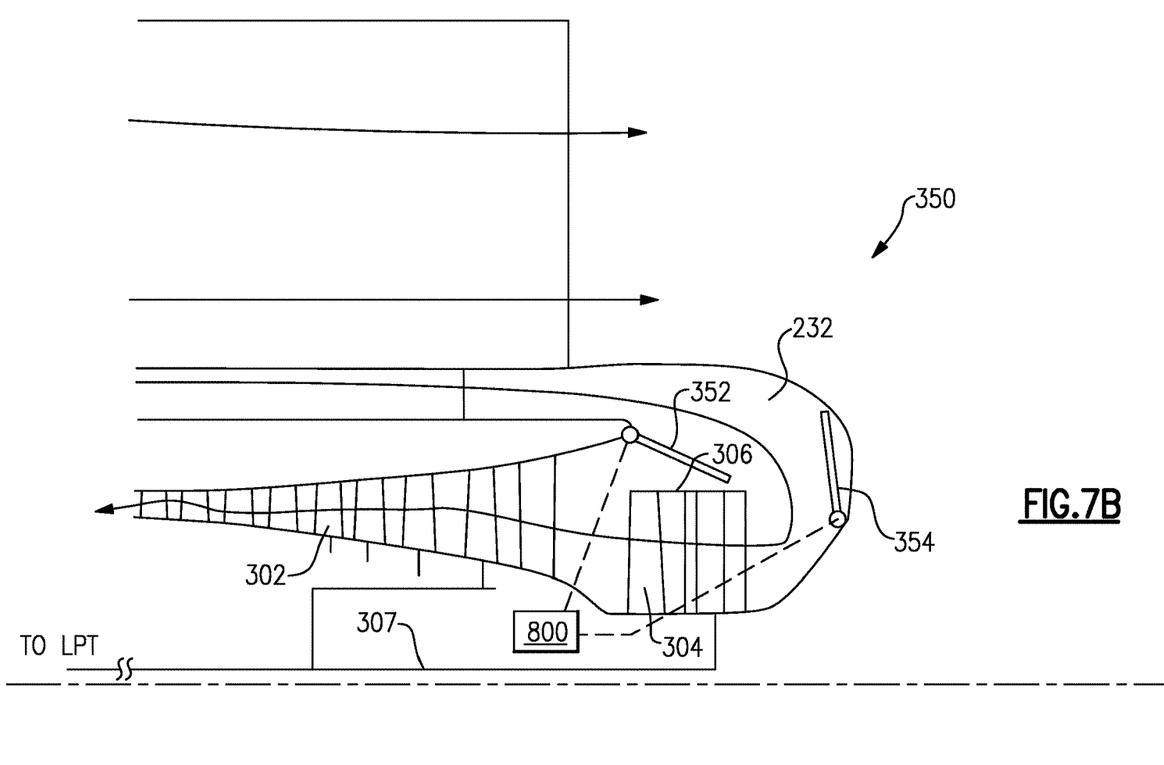
FIG. 7B shows the fourth embodiment feature and a second operative position.

FIG. 7B shows the position of the doors 352 and 254 during high power conditions such as takeoff on a hot day. In this position, the great bulk of the air is directed radially inward of the radially outermost extent 306 of the blades in the turbine section 304.

A schematic control 800 is illustrated in the figures and would operate to control the various components disclosed across this application. The control can be incorporated into a FADEC for the entire engine. A worker of ordinary skill in the art would be able to design such a control given the teachings of this disclosure.

For purposes of this application, the terms "low" or "high" relative to pressure or speed, and in core turbine and compressor sections simply are to be taken as relative terms. That is, the "high" would rotate at higher pressures and typically higher speeds than would the "low," although both might be at objectively high speeds and pressures. In addition, the term "cold" for the turbine sections downstream of the booster fan simply imply they are not part of the core engine. They may well operate at very high temperatures, even though they are referred to as "cold" in this application. The turbine sections which are in the core engine could be called "core turbine sections" for purposes of this application. The core turbine sections would typically be seeing higher temperature and pressure gases than would the "cold" turbine sections.

As should be understood, all of the gas turbine engines illustrated in all of these figures rotate about a central axis of rotation. The figures are generally illustrating only the upper half of that engine, and there is an axis of rotation shown generally in dashed line in each of the figures.

A worker of ordinary skill in this art would recognize that many modifications would come within the scope of this disclosure. For that reason, the following claims should be studied to determine the true scope and content of this application.

What is claimed is:

1. A method of operating a gas turbine engine comprising the steps of:
    (a) operating a main turbine section having a fan drive turbine driving a fan rotor of a fan section and a cold turbine section having blades with a radially outermost extent also driving said fan rotor, said cold turbine section located upstream from a combustor section such that a flow of fan air passes from the fan section to the cold turbine section and then on to the combustor section, in that order, and a pair of flow diverters operable to divert said flow of fan air radially inwardly of the radially outermost extent of the blades, or allow said flow of fan air to pass radially outwardly of the radially outermost extent of the blades; and
    (b) positioning said pair of flow diverters to increase or decrease the amount of said flow of fan air passing across said blades to increase or decrease a power output by said cold turbine section to said fan rotor.

2. The method as set forth in claim 1, wherein said pair of flow diverters moving between a first position which passes all of the flow of fan air radially inwardly of the radially outermost extent of the blades, and to a second position which diverts all of the flow of fan air radially outwardly of the radially outermost extent, said pair of flow diverters both being pivoted radially inwards in said first position and said pair of flow diverters both being pivoted radially outwardly in said second position.

3. The method as set forth in claim 2, wherein said pair of flow diverters is moved to the second position to allow bypass of the flow of fan air in low power conditions, such as when the gas turbine associated with the turbine section is in a aircraft at cruise conditions, and the pair of flow diverters being moved to the first position to direct the flow of fan air radially inwardly of the radially outermost extent at high power conditions, such as take-off for the aircraft.

* * * * *